United States Patent
Ewbank et al.

(10) Patent No.: US 6,498,261 B1
(45) Date of Patent: Dec. 24, 2002

(54) PROCESS FOR IMPROVING COLOR AND COLOR STABILITY OF OLEIC ACID

(75) Inventors: Edward L. Ewbank, Fairfield, OH (US); David J. Anneken, Cincinnati, OH (US)

(73) Assignee: Cognis Corporation, Gulph Mills, PA (US)

(*) Notice: Subject to any disclaimer, the term of this patent is extended or adjusted under 35 U.S.C. 154(b) by 0 days.

(21) Appl. No.: 08/479,503

(22) Filed: Jun. 7, 1995

(51) Int. Cl.$^7$ ................................................ C11B 3/12
(52) U.S. Cl. ...................................................... 554/205
(58) Field of Search .......................................... 554/205

(56) References Cited

PUBLICATIONS

Diechelmann et al., The Basics of Industrial Oleochemisty, Peter Pmp Gmbh(ISBN 3–89355–08–9), pp. 52–74.*
Lin et al., "Characterization of Minor Constituents in Commercial Oleic Acid", JOACS, vol. 59, No. 1 (Jan. 1982), pp. 42–46.
Murase et al., "Origin of Minor Constituents of Commercial Oleic Acid", JOACS, vol. 59, No. 1 (Jan. 1982), pp. 47–50.
Lin et al., "Qualitative and Quantitative Comparison of Minor Consttuents in Different CorOleic Acids", JOACS, vol. 59, No. 1, (Jan. 1982), pp. 50–51.
Diechelmann et al., The Basics of Industrial Oleochemistry, Peter Pmp GmbH (ISBN 3–89355–08–9), pp. 52–74, 1982.
Technical Bulletin 140A, Process and Facilities, Henkel Emery Group, 1982.

* cited by examiner

Primary Examiner—Deborah D. Carr
(74) Attorney, Agent, or Firm—John E. Drach; Henry E. Millson, Jr.

(57) ABSTRACT

The invention is a method for improving the color and color stability of oleic acid by a two column distillation process in which the oleic acid to be color improved is introduced into a first distillation zone containing an enriching section and a stripping section providing a minor amount of a topping product and a major amount of underflow containing the oleic acid and passing the oleic acid to a bottom portion of a second distillation zone having an enriching section to recover the improved oleic acid with improved color and color stability as a top product from the second distillation zone.

12 Claims, 1 Drawing Sheet

PROCESS FOR IMPROVING COLOR AND COLOR STABILITY OF OLEIC ACID

FIELD OF THE INVENTION

The invention relates to a process for improving color and color stability of oleic acid.

1. Background of the Invention

Oleic acid has many industrial and commercial uses and applications in which color is a major consideration. When oleic acid is introduced into many consumer products, a colorless or light colored material is required. In addition, when oleic acid is utilized in chemical processes as a reactant, color stability can be important if colorless or light colored products are required.

2. Related Art

It is known that the color and color stability of oleic acid is influenced by small amounts of minor components in oleic acid. The minor components and the effect on color and color stability are discussed in a series of articles which appeared in JAOCS, Vol. 59, No. 1 (January 1982) pgs.42–51; Sherman S. Lin et al., *CHARACTERIZATION OF MINOR CONSTITUENTS IN COMMERCIAL OLEIC ACID*, JOACS, Vol. 59, No. 1 (January 1982) pgs. 42–46; Yokunobo Murase et al., *ORIGIN OF MINOR CONSTITUENTS OF COMMERCIAL OLEIC ACID*; JAOCS, Vol. 59, No. 1 (January 1982) Pgs. 47–50; and Sherman S. Lin et al. qualitative and quantitative *COMPARISON OF MINOR CONSTITUENTS IN DIFFERENT COMMERCIAL OLEIC ACIDS*. JAOCS, Vol. 59, No. 1 (January 1982) Pgs. 50–51.

The articles disclose that about 1.2% of impurities in commercial oleic acid are responsible for the color and color instability of oleic acid. A portion of the color causing materials are present in the tallow (raw material) from which the oleic acid is produced and a portion of the color causing materials are formed during the production of oleic acid from tallow.

The articles disclose that the color causing materials (minor constituents) can be removed from oleic acid by adsorption on activated silicic acid. The method effectively removes the minor components from oleic acid. However, the adsorption method is generally not suitable for a commercial process due to the difficulty in regenerating the activated silicic acid or disposal of the spent solid.

Commercially, high purity, color stable oleic acid is produced by a combination of distillation and absorption methods with the consequent difficulty associated with handling and disposal of the solid adsorbent material. It would be useful to provide a commercial process which effectively improved the color and color stability of oleic acid without need for an absorption step. A number of distillation processes for fatty acids are disclosed in Diechelmann, G and Heinz, H. J., *THE BASICS OF INDUSTRIAL OLEOCHEMISTRY*, Peter Pomp GmbH (ISBN 3-89355-008-9), pages 52–74.

BRIEF DESCRIPTION OF THE INVENTION

The color and color stability of oleic acid can be improved by a distillation process which comprises introducing an oleic acid feed into a first distillation zone having an enriching section and a stripping section to separate a minor amount of a topping product and a major amount of a bottoms product containing the oleic acid and introducing the bottoms produced containing oleic acid into a lower portion of a second distillation zone having an enriching section and removing the purified oleic acid as the top product and a residue fraction from the bottom of the second distillation zone.

The process effectively reduces the amounts of the minor components which are responsible for color formation and color instability and produces a commercially useful, color stable oleic acid without need for an adsorption step. The oleic acid produced by the process of the present invention can be superior to, or at least equivalent to, commercially available oleic acid produced by a distillation and adsorption method without the concomitant difficulties associated with handling and disposal of solid materials.

BRIEF DESCRIPTION OF THE DRAWINGS

The figure is a diagrammatic representation of the process of the invention.

DETAILED DESCRIPTION OF THE INVENTION

Figure 1:
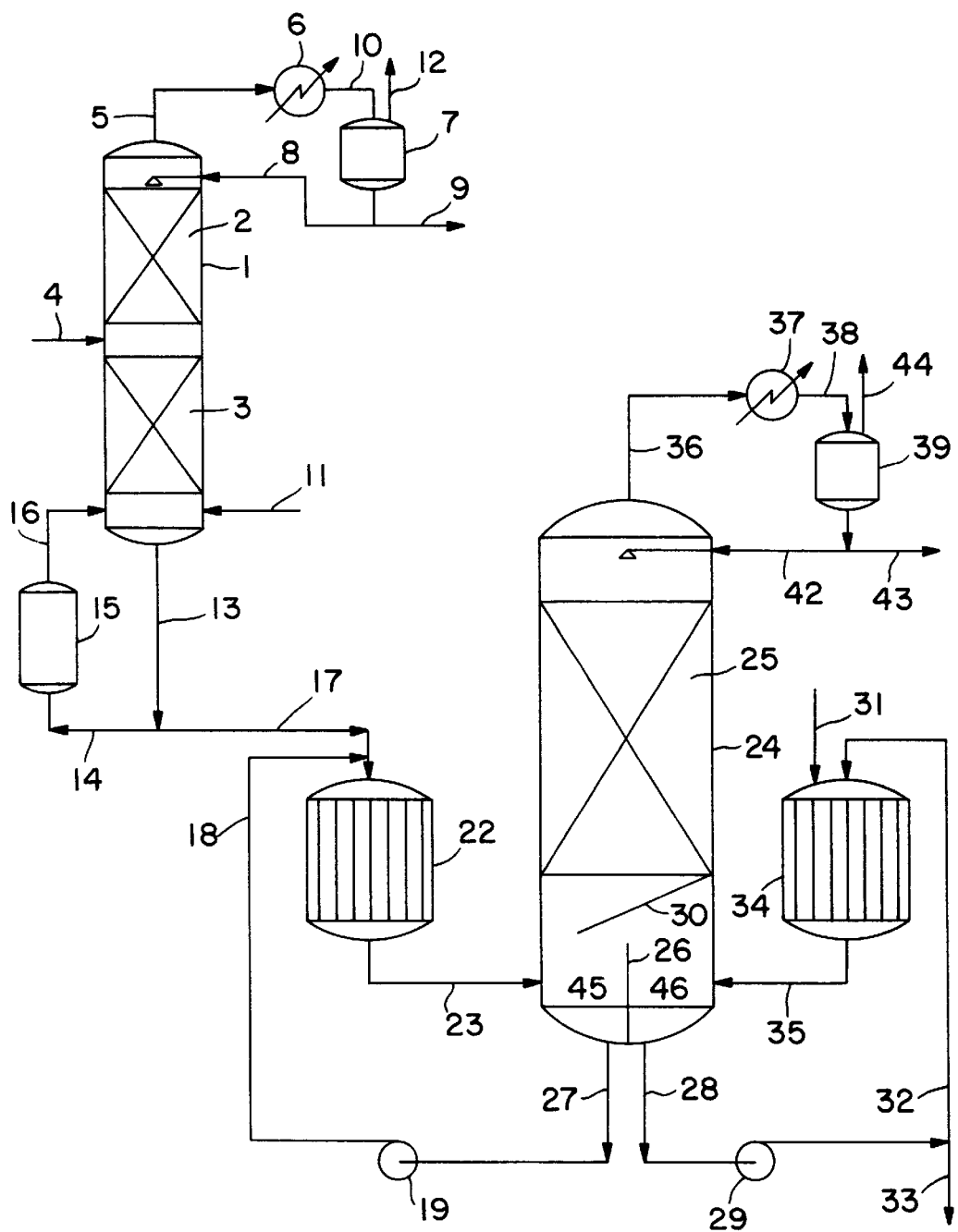

The oleic acid to be purified by the process of the invention is generally obtained from tallow. Tallow is a triglyceride containing as a major component mixed esters of oleic acid, palmitic acid and stearic acid. Glycerol esters of other carboxylic acids containing from about 8 to 20 carbon atoms can also be present in smaller amounts. The glycerol esters are generally hydrolyzed to provide a mixture of the carboxylic acids, which are present in the esters, and a dilute glycerine solution.

The mixture of carboxylic acids is dissolved in a solvent for the acids at an elevated temperature. The solution containing from about 20 to about 50% by weight of the acids in a solvent such as methanol is then cooled and the less soluble saturated carboxylic acids crystallize from the solution and are separated by a filtration step. The solution or suspension of the unsaturated carboxylic acids are separated from the solvent and utilized as feed to the process of the invention. An example of such a process is shown at Technical Bulletin 140A, Process and Facilities, Henkel Emery Group. In an alternative method the mixture of carboxylic acids is cooled to crystallize the higher melting point acids, the cooled mixture is mixed with water containing a surfactant and the crystalline material separated from the emulsion of the liquid acids.

The oleic acid feed to the process of the present invention generally contains from about 65 to about 80% by weight of oleic acid, smaller amounts of linoleic acid, linolenic acid, palmitic acid and stearic acid. The amounts of oleic acid, linoleic acid and linolenic acid in the mixture are in proportion to the amount present in the tallow from which the oleic acid feed to the process is obtained. The minor amounts of saturated carboxylic acids such as palmitic acid and stearic acid are residues of these acids which remained in the oleic acid from the crystallization step. In addition to the carboxylic acids, the oleic acid feed contains minor constituents which can affect the color and color stability of the oleic acid. To be a commercially useful material, the minor constituents are generally reduced to an amount which does not unduly affect the color and color stability of the oleic acid.

In the prior art process, the oleic acid feed was distilled and the column overhead product contains the oleic acid which is then subjected to an adsorption (bleaching step) in which the oleic acid was contacted with an adsorbent material. The adsorbent material removes a sufficient amount of the minor components to improve the color and color stability of the oleic acid.

The adsorption step requires the use of substantial amounts of a solid adsorbent which can cause handling and disposal problems. The process of the present invention eliminates the adsorption step and provides a process which is less expensive, easier to carry out, and produces an oleic acid with enhanced color and color stability.

In the process of the present invention the oleic acid feed described above is introduced into a central portion of a distillation column having an enriching section and a stripping section. In the enriching section, a small topping portion of lower boiling point and odor causing materials in the range from about 0.5 to about 5% by weight of the feed is removed as a topping product. The amount of topping product is determined by the reflux ratio and the distillation stages which are incorporated into the enriching section of the column. The reflux ratio is generally in the range of from about 5:1 to about 30:1 and is dependent upon the amount of topping product removed and the equivalent distillation stages in the enriching portion of the column.

Below the feed point, the column has a stripping section to aid in removing the lower boiling constituents from the bottoms product which comprises mainly oleic acid and other acids with boiling points near oleic acid and higher boiling point materials present in the feed. The bottom portion of the column is heated by a heating means. The column is generally operated at a reduced pressure at the top in the range from about 2 to about 15 mm of mercury, and a top temperature in the range of from about 150 to about to 180° C. The column bottom temperature is in the range of from about 200 to about 250° C. As is well known in the fatty acid distillation art, the columns are operated at reduced pressures to reduce the temperature in the columns to prevent thermal degradation of the fatty acids. A small amount of steam can be introduced into the bottom portion of the column to aid in removing the lower boiling point materials. The distillation columns are preferably packed columns and preferably packed with low pressure drop packing to lower the temperature in the column reboiler and reduce thermal degradation of the fatty acids.

The bottom product from the column contains the oleic acid and higher boiling point materials which have entered with the feed and has a reduced content of carboxylic acids with carbon numbers below about 14. However, the initial distillation is intended to remove small amounts of low boiling point materials which comprise minor components which affect the odor, color and color stability of the oleic acid.

The underflow from the column is passed to the bottom portion of a distillation column which comprises mainly an enriching section. The bottom product from the first distillation stage can be introduced directly into the bottom of the second distillation stage or can be introduced into the column a short distance above the bottom of the column with a short stripping section. However, it is preferred that the underflow from the first distillation stage be introduced directly into the bottom of the second distillation stage.

In the second distillation stage, the oleic acid product with an improved color and color stability is removed as a top product and a small amount of residue is removed from the bottom of the column. The reflux ratio is primarily dependent upon the number of theoretical distillation stages in the column and the purity of the oleic acid required. Generally, the column can be operated effectively with reflux ratios in a range from about 0.2 to about 1.0. However, higher reflux ratios can be utilized to provide a further improved product. However, increased reflux ratios require higher vapor flow and generally higher reboiler and bottom temperatures. The second column provides a top product comprising from about 85 to 95% of the feed and a residue comprising from about 5 to about 15% of the feed. The column can be operated at a top pressure in the range of from about 3 to about 10 mm of mercury and a temperature in the range of about 185° C. with a bottom temperature of about 220° C. to 280° C.

The overhead product from the second distillation step has a color and a color stability equivalent to that produced by commercially used distillation with an adsorption bleaching step. The process of the present invention does not require contacting the oleic acid product with a bleaching agent to obtain a light colored, color stable product.

The second distillation column is preferably a packed column but tray columns can be utilized. A stream sparge is preferably introduced into the bottom portion of the column.

The process will be described in relation to FIG. 1.

The oleic acid to be purified enters the distillation column 1 through line 4. The feed enters the column at a position between an enriching section 2 and a stripping section 3. The enriching and stripping sections can comprise bubble cap trays, sieve trays or a packing material. Preferably the enriching section 2 and the stripping section 3 contain low pressure drop packing materials such as SULZER™ BX or GLITSCH GEMPAK™. The overhead product from the column leaves the column through line 5 and is condensed in overhead condenser 6, the condensate passes through line 10 to collecting vessel 7. A portion of the overhead product is returned to the column as reflux through line 8 and overhead or topping product leaves the system through line 9. Depending upon the number of theoretical trays in the enriching section ,the reflux ratio between the overhead product returned to the column through line 8 to the topping product removed from the column through line 9 can be in the range of from about 5 to 30. The amount of topping product is relatively small, in the range of from about 0.5 to about 5% by weight of the feed, and comprises odor causing materials, carboxylic acids with less than 18 carbon atoms and a portion of the color body forming materials. The remainder of the feed material which has not been removed as the topping product will be removed from the bottom of the column through line 13 and line 17. Vapor is supplied to the bottom portion of the column through line 14, heat exchange means 15 and line 16. The heat exchange means can be a forced circulation heat exchanger, a falling film heat exchanger, a boiling tube heat exchanger (as shown), a shell and tube heat exchange means with the liquid on the outside of the tubes and the like. The heat exchange means can be any means which can provide heat to the system in the temperature range of from about 200 to 250° C. without undue fouling of heat transfer surfaces by degradation of the fatty acid materials and increase pressure.

The distillation column is operated under a reduced pressure and is connected to a vacuum system through line 12. The column generally operates at a top pressure in the range of from about 3 mm to about 15 mm of mercury. Steam can be introduced into the column through line 11 to aid in stripping the low boiling point and odor causing materials from the oleic acid feed; however, steam introduction is not critical and a suitable material can be prepared without steam introduction into column 1.

Applicants have discovered that one of the difficulties with removing the materials which degrade the color and color stability of oleic acid is that the color causing bodies and materials which reduce the color stability of the oleic acid are for the most part low boiling point materials which during the distillation form materials with higher boiling points. That is, the low boiling point color causing and color stability degrading compounds in the column overhead product and reflux, at the temperature of the top of the column, tend to form materials with higher boiling points which pass down through the column with the liquid phase. These newly formed, higher boiling point materials leave the process with the underflow through line 17. Since the oleic acid feed contains color causing materials and color stability degrading materials which are of a lower boiling point than oleic acid and materials which have a boiling point higher than oleic acid, or at least in the same range, it is not possible to produce a low color, color stable oleic acid with a single distillation column.

The underflow from the first distillation step which is in the range of from about 95 to about 99.5% by weight of the entering feed is introduced into the bottom portion of column 24 through falling film heat exchange means 22 and line 23. The bottom portion of distillation column 24 contains a baffle 26 which separates the material circulating through falling film heat exchanger means 22 through line 27, pump 19, and line 18 from the material being circulated over falling film heat exchanger means 34 through line 28, pump 29, and line 32, falling film heat exchanger means 34 and line 35.

Falling film heat exchange means 22 and separate heat exchange means 34 operating on separate streams is disclosed. However, any other heat exchange means which is suitable for heating the residue in the bottom portion of column 24 to a temperature in the range of about 220 to about 280° C. can be utilized. A wiped film heat exchange means can also be useful. The vapor generated by falling film heat exchange means 22 and 34 passes through enriching zone 25 and leaves the column through line 36. The vapor is condensed in condenser 37, passes through line 38 to receiving vessel 39. A portion of the condensed vapor is returned to the column through line 42 as reflux and a purified oleic acid product with excellent color and color stability is removed from the process through line 43. The system operates at a reduced pressure and line 44 is connected to the vacuum producing system (not shown).

In an alternate embodiment of the invention (not shown), the vapor generated in falling film evaporator 34 can be separated from the vapor in column 24 and treated separately in a distillation column or other process.

The enriching section 25 of column 24 can be any means known in the art for contacting a liquid with a gas in a distillation apparatus. However, it is preferred that a low pressure drop contacting means be utilized. Preferably, the enriching zone 25 is a packed section with low pressure drop characteristics. Depending upon the number of theoretical stages in the enriching zone 25, the reflux to product ratio is in the range of form about 0.2 to about 1.5 and preferably 0.4 to 1.0. Lower reflux ratios are preferred due to the nature of the residues which are removed from column 24 through line 33. Reflux is critical since a simple distillation does not provide a low color, color stable oleic acid.

To obtain the lowest concentration of oleic acid in the residue from column 24, a two heat exchange system is utilized. In the heat exchange system comprising falling film heat exchange means 22, the feed entering the column is maintained and circulated over the falling film heat exchange means 22 along with the reflux which flows down through the enriching section 25. The reflux is directed to section 45 on one side by baffle means 26. Falling film heat exchange means 22 is operated at a temperature of from about 215° C. to about 240° C.

To ensure maximum stripping of the low boiling point materials from the residues, excess material in column bottom section 45 overflows baffle 26 to column bottom section 46. Material in bottom section 46 of column 24 is circulated through line 28, pump 29, line 32 falling film heat exchange means 34 and line 35 and enters the column. A small amount of steam is continually introduced into falling film heat exchange means 34 through line 31 to aid in removing the low boiling point materials from the residues. The residues are removed from the system through line 33. The amount of residue amounts to from about 5 to about 15% and most preferably from about 6 to about 10% by weight of the feed. Heat exchange means 34 generally operates at a temperature in the range of from about 240° C. to about 280° C.

The enriching section 25 comprises means for contacting the liquid reflux with the rising vapors from the reboiler section of the column. Any means known in the art to contact the liquid with the vapor which does not unduly increase the pressure at the bottom of the column can be used. Generally, the column is operated at a top pressure in the range of from about 2 to about 15 mm Hg and preferably from about 4 to about 10 mm Hg. Preferably, the enriching section 25 is a packed section, and preferably a section packed with low pressure drop packing such as SULZER™ BX, GLITSCH GEMPAK™ or KOCH FLEXIPAC™.

The low pressure drop packing aids in maintaining the pressure and temperature at the bottom of the column in a range such that the oleic acid is substantially removed from the residue and substantial amounts of fatty acids are not degraded by high temperatures. Although falling film heat exchange means are disclosed, any means suitable for transferring heat to the viscous residue materials in a temperature range from about 220 to about 280° C. can be utilized in the process. Preferably a small amount of steam is continuously introduced into column 24 through line 31. The steam passes through falling film heat exchange means 34 and enters the column through line 35. The small amount of steam aids in stripping the low boiling point materials from the residue and improving the yield of the process and is preferred.

The process as set forth was invented when it was discovered that the color causing and color destabilizing compounds which have a boiling point lower than oleic acid were reacting in the upper portion of a distillation column forming color causing and color destabilizing materials which have a boiling point higher than oleic acid. This phenomenon makes it difficult to make a suitable separation between oleic acid and the color causing and color stability reducing compounds in the oleic acid feed in a single distillation column. As the prior art discloses, rather than using a column comprising mainly a stripping section for the second distillation stage, it was discovered that a second column containing primarily an enriching section is best suited to separate the oleic acid from a major portion of the color causing and color stability reducing compositions.

The following example illustrates the process of the invention.

TABLE 1

OLEIC ACID FEED

| Carboxylic Acid | % by Weight |
|---|---|
| Low Boiling Point Material | 1.0 |
| $C_{10}$ | 0.09 |
| $C_{12}$ | 0.28 |
| $C_{14}$ | 0.23 |
| $C_{14:1}$ | 0.75 |
| $C_{15}$ | 0.66 |
| $C_{16}$ | 3.3 |
| $C_{16:1}$ | 5.66 |
| $C_{17}$ | 0.95 |
| $C_{18}$ | 0.95 |
| $C_{18:1}$ | 66.0 |
| $C_{18:2}$ | 10.1 |
| $C_{18:3}$ | 1.4 |
| $C_{20}$ | 1.3 |
| mono-, di- and triglycerides | 5.0 |

A sample of the oleic acid feed was distilled in a first column having an enriching section with 6 theoretical stages, and a stripping section with 3 theoretical stages at a reflux ratio of 24 with a pressure at the top of the column of six (6) mm Hg and a top temperature of 180° C. and a reboiler temperature of 221° C. The feed was introduced continuously into the column and the top cut and the bottom cut were continuously removed. No steam was introduced into the first column.

The bottoms from the first column was then passed to a second column having an enriching section with six (6) theoretical stages. The second column was operated at a pressure at the top of the column of 5.3 mm Hg and a top temperature of 211° C. The bottom of the column was operated at a pressure of 12.1 mm Hg and a temperature of 234/251° C. The reflux ratio was 0.3 and the residue removed from the bottom of the column was 11% of the feed. Steam in an amount of 0.005 parts per part of feed was introduced into the bottom of the column. The color and color stability of the product removed from the top of the column is shown in Table 2.

TABLE 2

| | | |
|---|---|---|
| Overhead Product Second Column | Color (% Transmission 440 nm/550 nm) Color Stability (% Transmission at 440 nm/550 nm after heating at 205° C.) | 88/99<br>$N_2$  Air<br>72/96  36/87 |
| Commercial Double Distilled Oleic Acid | Color (% Transmission 440 nm/550 nm Color Stability (% Transmission at 440 nm/550 nm after heating at 205° C.) | 86/99.6<br>Air<br>24/79 |
| Commercial Single Distilled Oleic Acid | Color (% Transmission 440 nm/550 nm) Color Stability (% Transmission 440 nm/550 nm after heating at 205° C.) | 72/98<br>$N_2$  Air<br>39/84  17/73 |

As can be seen in the results presented into Table 2, the color and color stability are at least as good as the color and color stability of double distilled oleic acid which is prepared by a distillation and adsorption process.

The % transmission of the oleic acid was measured at 440 nm and 550 nm according to the A.O.C.S. Official Method CC13C-50. The color stability was measured according to A.O.C.S. Official Method TD3a-64. An additional test under the heading Air was done according to a modified method A.O.C.S. Official Method TD3a-64 in which the tops were removed from the sample tubes and the samples were permitted to be in contact with air during the one (1) hour heating period.

The same feed as treated according to the process of the invention was distilled using current distillation process. The feed was introduced into the bottom of a distillation column containing two three meter sections of low pressure drop packing, each section comprised 6 (six) theoretical stages. Heat was supplied to the column through two falling film vaporizers operating at 230° C. and 249° C. The pressure at the top of the column was 6 mm Hg and the top temperature was 175° C. The pressure at the bottom of the column was 11.8 mm Hg. Steam in an amount of 0.005 parts per part of feed was introduced into the falling film vaporizer operating at 249° C. The vapor from the top of the column was passed to a partial condenser in which more than 99% by weight of the vapor was condensed and returned to the column as reflux, a top product amounting to less than 1% of the vapor from the top of the column was condensed as a top product. The liquid leaving the top section of packing was collected, the product removed and a portion returned as reflux to the bottom section of packing. The reflux ratio in the top section of packing was about 120 and the reflux ratio in the bottom section of packing was 0.3. The product had a % transmission at 440 nm and 550 nm of 81/98 and a % transmission at 440 nm and 550 nm after heating at 205° C. under nitrogen for 2 hours of 67195 and after heating at 205° C. under air for 2 hours of 28/83.

As can be seen, the process of the present invention provides oleic acid with improved color and color stability over oleic acid prepared by a known commercial process using the same feed stock.

We claim:

1. A process for improving the color and color stability of oleic acid which comprises introducing an oleic acid feed into a first distillation column at a point between an enriching section and a stripping section to separate a minor amount of a topping product and major amount of a column bottom product containing the oleic acid and introducing the bottom product into a lower portion of a second distillation column having an enriching section and removing a purified oleic acid as a top product and a residue fraction from the bottom of the column.

2. The process of claim 1 wherein vapor flow to the second distillation column is provided by a falling film heat exchange means.

3. The process of claim 2 wherein the falling film heat exchanger means comprises a first falling film heat exchange means which vaporizes a portion of the bottoms product from the first distillation column and a portion of the reflux returning to a first segregated zone and a portion of the vapor flow is provided by a second falling film heat exchange means which vaporizes excess material in a second segregated zone which passes from the first segregated zone in the column bottom.

4. The process of claim 1 wherein steam is introduced into the bottom portion of the first distillation column.

5. The process of claim 1 wherein steam is introduced into the bottom portion of the second distillation column.

6. The process of claim 4 wherein steam is introduced into a falling film heat exchange means which vaporizes material in the second segregated zone in the bottom portion of the second distillation column.

7. The process of claim 1 wherein heat is provided to a bottom portion of the first distillation column by means of a forced circulation heat exchange means.

8. The process of claim 1 wherein steam is introduced into a bottom portion of the first and the second distillation columns.

9. The process of claim 1 wherein heat is provided to a bottom portion of the first distillation column by a shell and tube heat exchange means with tube side steam.

10. The process of claim 1 wherein the first distillation column is operated at a reflux ratio of from about 5:1 to 30:1 and the second distillation column is operated at a reflux ratio of from about 0.2:1 to about 1:1.

11. The process of claim 10 wherein the second distillation column does not comprise a stripping section.

12. The process of claim 1 wherein the second distillation column does not comprise a stripping section.

* * * * *